UNITED STATES PATENT OFFICE.

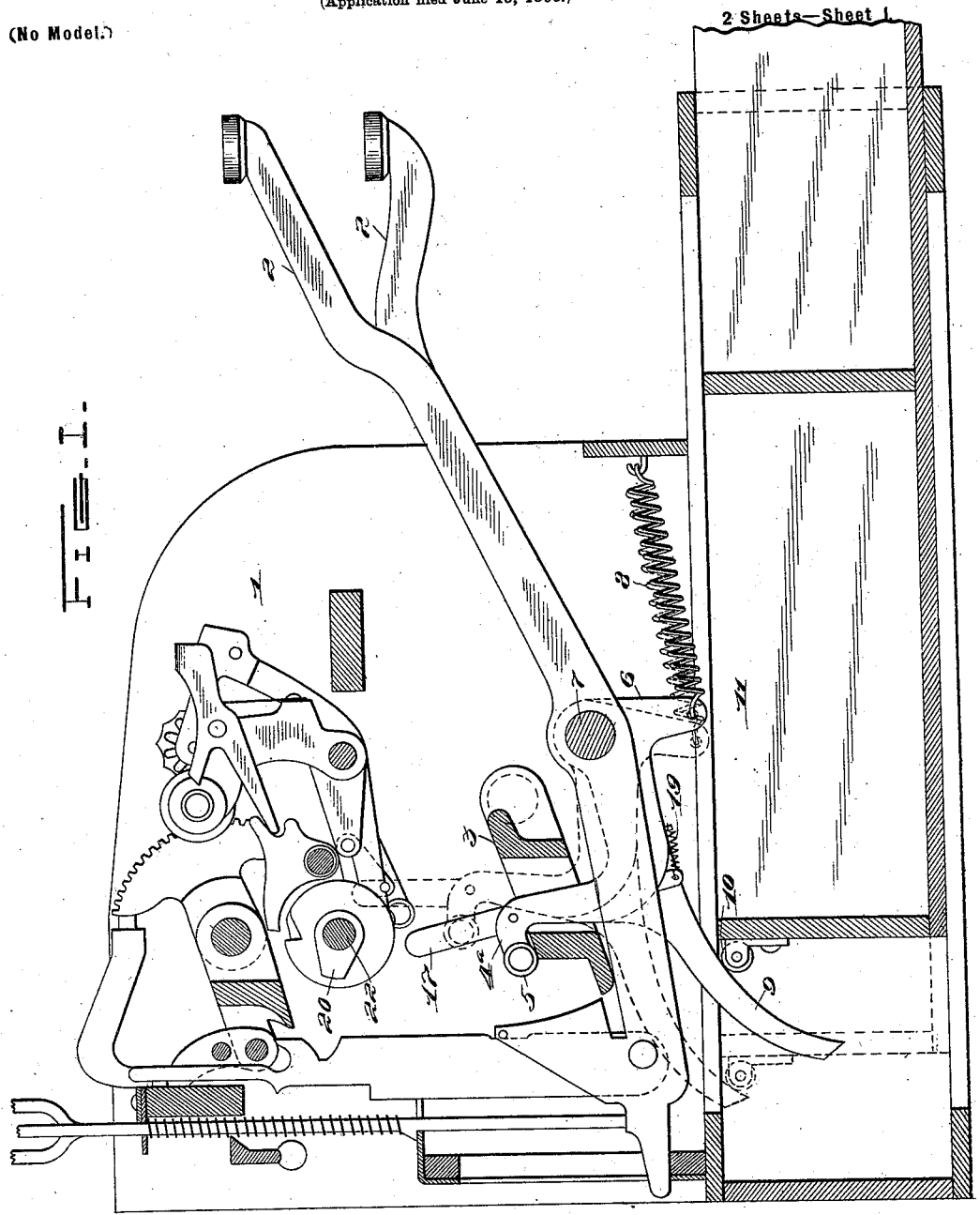

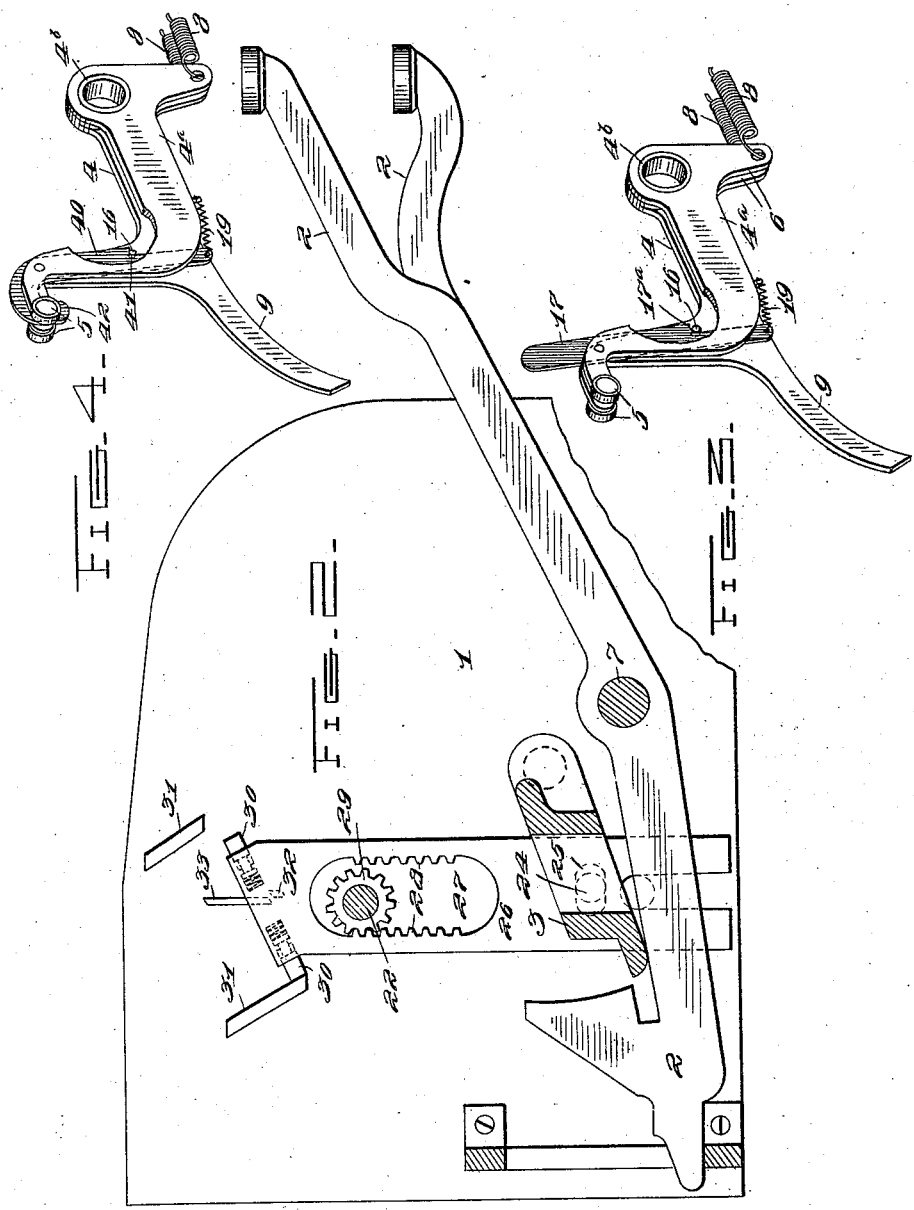

JOSEPH P. CLEAL, OF DAYTON, OHIO, ASSIGNOR TO THE NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 690,562, dated January 7, 1902.

Application filed June 19, 1900. Serial No. 20,789. (No model.)

*To all whom it may concern:*

Be it known that I, JOSEPH P. CLEAL, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash-registers, and has more particular relation to improvements in registers of the type patented to Thomas Carney, No. 532,762, dated January 22, 1895.

One of the several objects of the invention is to provide improved means in a cash-register for lightening the load upon the operating-keys, and thus securing the requisite light key action.

In the appended drawings, forming part of this specification, Figure 1 represents a central vertical section through a machine of the class mentioned with my invention applied thereto, the drawer being shown in its open position and the reverse position of said drawer and coacting parts being indicated by dotted lines. Fig. 2 represents a similar view taken on a line near one end of the machine, the cash-drawer being omitted. Fig. 3 represents an enlarged detail perspective view, partly broken away, of the spring-actuated levers for returning the key-coupler; and Fig. 4 represents a view, similar to Fig. 3, of a modified form of my device.

In the aforesaid drawings, 1 represents the frame of the machine; 2, the operating-keys; 3, the key-coupler, and 4 and $4^a$ the operating-levers.

The constructions and operations of the keys, counter, indicators, and key-coupler are substantially the same as described in the aforesaid patent, and I will therefore refer to the same for a detail description of such parts. One exception to the above is that the usual returning-springs for the coupler, to draw the same down after being elevated, are omitted, which of course permits of the coupler being raised with very little effort by the operated key. Therefore to provide returning means for the coupler I furnish the aforesaid levers 4 and $4^a$.

An antifriction-roller 5 is mounted near the upper end of the bell-crank lever 4, which projects through one of the usual openings of the key-coupler and is provided with a hub $4^b$, journaled upon the transverse key-shaft 7. The pendent arm 6 of this lever is connected to the main frame by a coil-spring 8, so that when the said lever is rocked upward at its rear end the spring is put under tension. The lever is rocked in the aforesaid manner upon the closing of the slidable cash drawer or receptacle 11 by an antifriction-roller 10, mounted on said drawer and contacting with a downwardly and rearwardly curved arm 9, formed on said lever.

The lever $4^a$ is journaled on the sleeve $4^b$ and is similar in all respects to the lever 4, with the exception that it is not provided with the downwardly and rearwardly curved arm 9. This lever $4^a$, although not provided with such an arm, is arranged to be elevated with the lever 4, and thus put its respective spring 8 under tension. This effect is accomplished by providing the lever $4^a$ with a pivoted latch-lever 17, (see Fig. 3,) formed with a notch $17^a$ and normally drawn forward at its lower end by a coil-spring 19, which connects it to said lever. This latch-lever is located upon the side of the lever $4^a$ next to the lever 4, so that a pin 16, mounted on the latter lever, will normally project into the notch $17^a$ and prevent the lever 4 from being raised without carrying the lever $4^a$ with it.

When the cash-drawer is closed, the lever 4 is operated and elevated, as above described, and through the medium of the pin and latch-lever also elevates the lever $4^a$, said levers being moved to the dotted-line position shown in Fig. 1. Should a key now be operated, the key-coupler is raised, and as the final downward stroke of the key is made the lever $4^a$ is released from the lever 4 by a cam 20 upon the rotation-shaft 22 of the machine striking the upper end of the latch-lever 17, and thus moving said latch sufficiently to disengage it from the pin 16. The lever $4^a$ descends a slight distance before its roller 5 engages the coupler, and thus said roller strikes the coupler a sharp blow, which readily starts its return movement. After the return movement of the coupler has commenced the cash-drawer is released in the usual manner and the lever 4 thus allowed to descend and assist in the return of the coupler.

The rotation-shaft 22 is operated from the key-coupler in a manner well known in the art and clearly shown in Fig. 2. For this purpose the key-coupler is provided at one end with a stud 24, which projects into a horizontal slot 25, formed in a rack-plate 26. This plate is provided with an aperture 27, the opposite walls of which are formed with rack-teeth 28, which are arranged to alternately engage a pinion 29, fast to said shaft 22. The rack-plate is shifted to accomplish this result by spring-pressed plungers 30, mounted in its opposite sides near its upper end and arranged to engage incline stationary flanges 31, mounted on the main frame. A stud 32, formed on the rack-plate, coöperates with a vertical flange 33, mounted on the main frame, to hold the rack-plate to its work when moving in either direction. As these devices are well known in the art and form no part of my present invention, any further description of the same is thought to be unnecessary.

Should an attempt be made to fraudulently operate the machine by holding the cash-drawer closed after it has been released, the lever 4 will of course be held in its elevated position by its arm 9, but the lever 4ª will be released, as above described, and will return the key-coupler and keys to normal position irrespective of the lever 4. While the spring 8 of the lever 4ª is of sufficient strength to return the coupler, as above described, it will not produce alone a sufficiently rapid movement for the usual operation of the machine. The combined tensions of the springs 8 are thus necessary to produce the proper working rapidity.

It will be observed from the above description that both of the springs 8 are put under tension by the closing of the drawer, and the operation of the keys is thus free of any retarding spring influence.

In the modified form of my device shown in Fig. 4 the parts are similar to those shown in Fig. 3, with the exception of the pivoted latch 40. The shoulder 41 of this latch forms, in effect, a notch in which the pin 16 may become firmly seated, so that the latch must be bodily raised before it can be disengaged from said pin. The lower portion of this latch is drawn forward substantially in the same manner as the latch 17; but the upper portion of the same instead of being struck by a cam on the rotation-shaft is operated by the key-coupler. To effect this result, the upper portion of the latch is given the hook formation 42, (shown in Fig. 4,) so that when in its normal position (shown in said figure) its end will project slightly below the rollers 5. When the key-coupler is raised by the operated key, it engages the projecting end of the latch and rocks it on its fulcrum to disengage its notch from the pin 16 and allow the lever 4ª to operate independently to return the coupler in the same manner as heretofore described.

Having thus described my invention, what I claim as new, and desire to secure by Letters Patent, is—

1. In a cash-register, the combination with a series of keys, of a cash-receptacle, and key-returning devices arranged to be set by the movement of the cash-receptacle but to operate independently of the movement of the same.

2. In a cash-register, the combination with a series of keys, of a cash-receptacle and a spring put under tension by the closing of the receptacle but arranged to expend its power irrespective of the movement of the same, and means operated by said spring for returning the keys to their normal positions.

3. In a cash-register, the combination with a series of keys, of a key-coupler, a cash-receptacle, and spring devices put under tension by the closing of the receptacle and arranged to return the coupler to normal position irrespective of the movement of said receptacle.

4. In a cash-register, the combination with a series of keys, of a key-coupler, a cash-drawer, a spring-drawn lever arranged to be set by said drawer, another spring-drawn lever arranged to operate the coupler, a latch connecting said levers and means for tripping said latch upon the operation of the machine.

5. In a cash-register, the combination with a series of keys, of a key-coupler, a cash-drawer, a pivoted spring-drawn lever arranged to be set by said drawer, another spring-drawn lever, and means connecting the two levers whereby they are set simultaneously but may return independently.

6. In a cash-register, the combination with a series of keys, of a key-coupler, a cash-drawer, a spring-drawn lever arranged to be set by said drawer, another spring-drawn lever, a latch carried by this latter lever and engaging the first-mentioned lever, and means operated by the movable parts of the machine for releasing said latch.

7. In a cash-register, the combination with a series of keys, of a key-coupler, a cash-drawer, a pivoted spring-drawn lever arranged to be operated by said drawer, another pivoted spring-drawn lever arranged to be operated by the first-mentioned lever, a latch connecting the two levers so that they move together, and a cam operated by the movable parts of the machine for tripping said latch.

8. In a cash-register, the combination with a series of keys, of a key-coupler, a cash-receptacle, a pivoted spring-drawn lever arranged to be operated by the cash-receptacle to put its spring under tension, another spring-drawn lever arranged to be actuated by the first-mentioned lever but to be released from the same so as to alone actuate the coupler.

9. In a cash-register, the combination with a series of keys, of a key-coupler, a cash-drawer, pivoted spring-drawn levers arranged to be moved by the closing of the drawer to put the springs under tension, and means for releasing one of said levers to permit it to return the coupler independently of the opening of the drawer.

10. In a cash-register, the combination with a series of keys, a member common to said keys, a cash-receptacle and a returning-spring for said common member arranged to be put under tension by the movement of the cash-receptacle but adapted to expend its force independently of the movement of said receptacle.

11. In a cash-register, the combination with a series of keys, of a member common to said keys, a cash-receptacle, a spring put under tension by the closing of the receptacle, but arranged to expend its power independently of the movements of the receptacle to return the common member to normal position.

12. In a cash-register, the combination with a series of keys, of a frame common to the same, a cash-drawer, a movable member arranged to be operated by the cash-drawer, a spring-drawn member adapted to return the frame to normal position and arranged to be set by the first-mentioned member but to operate independently of the same.

In testimony whereof I affix my signature in the presence of two witnesses.

JOSEPH P. CLEAL.

Witnesses:
IRA BERKSTRESSER,
ALVAN MACAULEY.